United States Patent
Baumann (10) Patent No.: US 7,457,837 B2
(45) Date of Patent: Nov. 25, 2008

(54) SYSTEM AND METHOD FOR PRECISE CALCULATION OF ALTERNATIVE UNITS OF MEASURE

(75) Inventor: Alexander Baumann, Roettenbach (DE)

(73) Assignee: SAP AG, Walldorf (DE)

( * ) Notice: Subject to any disclaimer, the term of this patent is extended or adjusted under 35 U.S.C. 154(b) by 747 days.

(21) Appl. No.: 10/747,981

(22) Filed: Dec. 31, 2003

(65) Prior Publication Data
US 2005/0144206 A1    Jun. 30, 2005

(51) Int. Cl.
*G06F 7/00* (2006.01)
(52) U.S. Cl. .................................. 708/206
(58) Field of Classification Search .............. 708/206
See application file for complete search history.

(56) References Cited

U.S. PATENT DOCUMENTS

| | | | | |
|---|---|---|---|---|
| 4,228,516 A | * | 10/1980 | Johnston, Sr. .................. 708/3 |
| 5,101,368 A | * | 3/1992 | Kaplan ........................ 708/206 |
| 6,477,510 B1 | * | 11/2002 | Johnson ........................ 705/30 |
| 2004/0068529 A1 | * | 4/2004 | Pai ............................. 708/206 |

* cited by examiner

*Primary Examiner*—Chuong D Ngo
(74) *Attorney, Agent, or Firm*—Kenyon & Kenyon LLP

(57) ABSTRACT

A system and method for product planning that require conversion among various alternative units of measure. The system receives three inputs: (1) a conversion relation between a base unit of measure and an alternative unit of measure, (2) a degree of precision for storage, and (3) a length of conversion factor allocated by the system. The system determines an increment quantity, which represents the smallest quantity of the material used as a base quantity in the manufacturing and design process, while maintaining the degree of precision for storage and the length of the conversion relation. The system then adjusts the conversion relation between the base unit of measure and the alternative unit of measure to correspond to the increment quantity. The increment quantity and the adjusted conversion relation are stored in the system. Theretofore, the system adjusts all input data, regardless of whether it was entered by a user or by another application in the system, using the increment quantity and the adjusted conversion factor, and maintains all data as multiples of the increment quantity.

28 Claims, 7 Drawing Sheets

GIVEN:
- Length of Conversion Factor Numerator and Denominator [LCF]
- Degree of Precision for Storage [DPS]
- Conversion Relation Between a Base Unit of Measure and an Alternative Unit of Measure

FIG. 1

GIVEN:
- Length of Conversion Factor Numerator and Denominator [LCF]
- Degree of Precision for Storage [DPS]
- Conversion Relation

FIG. 2

GIVEN:
- Length of Conversion Factor Numerator and Denominator [LCF]
- Degree of Precision for Storage [DPS]
- Conversion Relation (A = B, where A = Quantity in Base UofM (e.g. 3 KG), and B = Quantity in Alternative UofM (16 M)
- Increment Quantity [IQ] (1.4 KG)

FIG. 3

GIVEN:
- Length of Conversion Factor Numerator and Denominator [LCF]
- Degree of Precision for Storage [DPS]
- Conversion Relation (CF) A=B, A = Quantity in Base UofM (3 KG ), and B = Quantity in Alternative UofM (16 M)
- IQ: Increment Quantity = Quantity in Base UofM (e.g. 1.4 KG)
- RIQ: LCM factor (Default = 1)

FIG. 4

GIVEN:
- Length of Conversion Factor Numerator and Denominator [LCF]
- First Factor having a Common Unit of Measure
- Second Conversion Relation Between the Common Unit of Measure and a New Alternative Unit of Measure

FIG. 5

GIVEN:
- Length of Conversion Factor Numerator and Denominator [LCF]
- Degree of Precision for Storage [DPS]
- Conversion Relation
- Degree of Precision for Display

SYSTEM AND METHOD FOR PRECISE CALCULATION OF ALTERNATIVE UNITS OF MEASURE

BACKGROUND

Embodiments of the present invention relate to computerized systems of maintaining data with accuracy and, more particularly, to systems that provide accurate one-to-one conversions among various alternative units of measure.

As production processes get bigger and more standardized, many manufacturing and production plants handle their materials in "pieces" by developing a linked association between various variable types that are now necessarily consistent with each other. For example, a cable company may handle its materials in pieces, each piece having a predefined length and weight. Computer applications used by the company, such as product planning tools, typically define a level of precision for storing these various variables in its systems because the memory space is limited. Often, these values having different units of measure are used interchangeably, thereby requiring conversion among the values represented in different units of measure. Because of the predefined degree of precision, however, the conversion between different units of measure often leads to rounding errors.

For example, consider the same cable company that handles the cable in pieces. Assume further that the warehouse uses an inventory management system that allocates three decimal places for storing/displaying the weight of the cable pieces. Thus, in the inventory management system, one piece of cable weighs 2.333 KG/PC. If there are three pieces of cable pieces in the stock, the inventory management system may display 7.000 KG for the total weight of these cable pieces (conversion relation: 3 PCs=7 KG). If each piece was sold separately one piece after another, the inventory management system may display the following:

| No. of Cable Pieces in Stock | Total Weight (KG) |
|---|---|
| 3 | 7.000 |
| 2 | 4.667 |
| 1 | 2.334 |
| 0 | 0.001 |

As illustrated, when there is no cable piece left, the system may still indicate that the weight of cable is 0.001 KG. These rounding errors may seem nominal when the warehouse deals with a small quantity. But, if the warehouse is dealing with a large quantity, such as 30,000 pieces, the rounding error may be as big as 10 KG, which amounts to more than 4 pieces. Thus, as the production process gets bigger in scale, these inaccuracies in the conversions may cause unacceptable computational errors.

Moreover, the pieces used by these manufacturing and production systems are typically defined in more than one physical dimension. For example, in the above example, a piece of cable may be defined with three dimensions, its length, weight, and price. Each of these dimensional values represented in one unit of measure may also be represented in one or more alternative units of measure. For example, the length of cable may be represented in meters (M) or feet (FT). The weight of cable may also be represented in kilograms (KG) or pounds (LB). Further, the pieces of the cable may be priced in USD or Euro. These various values are correlated with one another, and each of these values in different units of measure is restricted to the same or similar degrees of precision. Such a system, however, may cause rounding errors when the value is converted to alternative units of measure of the same or different dimensions. Any attempt to perform product planning, for example, in the existence of these rounding errors, may result in inaccurate planning results.

The larger the difference in the degrees of precision between two variables the more significant the rounding errors will be. These rounding errors could lead to wasted resources, and sometimes, defects in the product production.

Accordingly, there is need in the art for a system that manages these quantities and provides an accurate one-to-one conversion among various values represented in alternative units of measures.

DETAILED DESCRIPTION

Embodiments of the present invention provide a computerized system and method that manage data in one or more units of measure by providing adequate conversions among one or more alternative units of measure. Embodiments of the present invention may find particular application in systems that use variables with decimals in more than one unit of measure where the system allocates a certain degree of precision for storing data values. One embodiment of the present invention comprises determining an increment quantity; adjusting a conversion relation between a base unit of measure and an alternative unit of measure to correspond to the increment quantity; and adjusting an input value using the increment quantity and the adjusted conversion relation. In this way, embodiments of the present invention may provide precise conversion among various units of measure. This, in return, may reduce rounding errors and system defects caused by product planning tools, and other similar systems that manage data in various units of measure.

Figure 1:
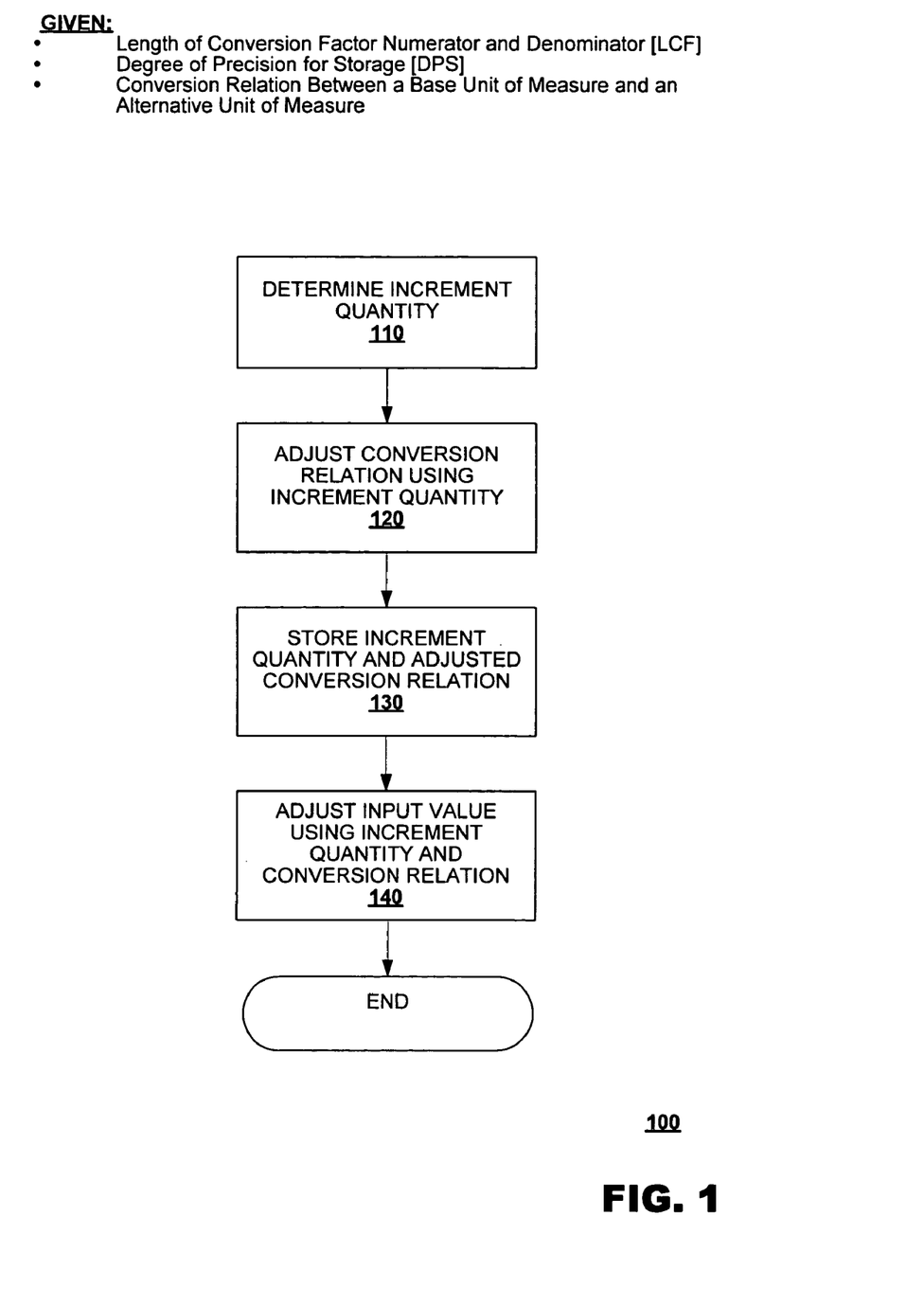
FIG. 1 illustrates a method for providing accurate conversions among one or more units of measure according to an embodiment of the present invention.

FIG. 1 illustrates a method 100 for providing accurate one-to-one conversions among various alternative units of measure. The method 100 may receive three inputs: (1) a conversion relation between a base unit of measure and an alternative unit of measure, (2) a degree of precision for storage ("DPS," or a number of decimal places), and (3) a length of conversion factor allocated by the system ("LCF"). The method 100 may determine an increment quantity while maintaining the degree of precision for storage and the length of the conversion relation (box 110). The increment quantity is a master datum that represents the smallest quantity of the material used as a base quantity in the manufacturing and design process. The method 100 may adjust the conversion relation between the base unit of measure and the alternative unit of measure to correspond to a given increment quantity (box 120). The method 100 may then store the increment quantity and the adjusted conversion relation (box 130). The method 100 may adjust an input value using the increment quantity and the adjusted conversion relation (box 140).

In accordance with one embodiment of the present invention, the method 100 may provide precise automated one-to-one conversion among various alternative units defined with different degrees of precision, thereby facilitating more accurate planning results compared to conventional conversion methods. The method 100 has a particular application when the manufacturing and production processes handle materials in pieces that have a linked association between various variable types that are of different dimensions. The method 100 may also have utility for processes that do not handle materials in pieces, but require conversion among various units of measure.

Figure 2:
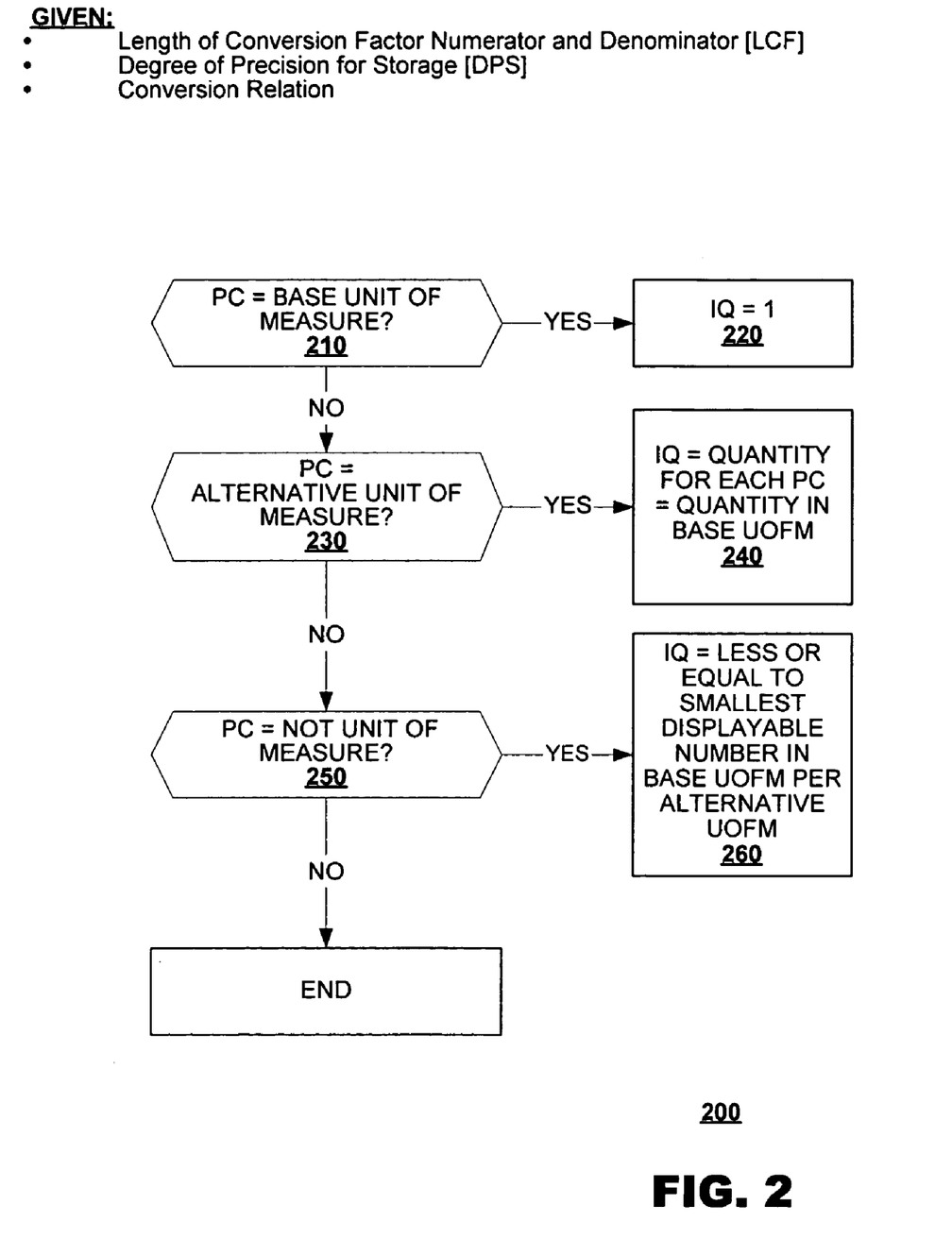
FIG. 2 illustrates a method for determining a default increment quantity according to an embodiment of the present invention.

FIG. 2 illustrates a method 200 for determining a default increment quantity given a conversion relation between a base unit of measure and an alternative unit of measure where the system allocates a certain degree of precision for storing data values and a length of a conversion factor, according to an embodiment of the present invention. As mentioned above, the increment quantity is a master datum that represents the smallest quantity of the material used as a base quantity in the manufacturing and design process. This increment quantity becomes fixed and cannot later be changed. All other quantities used in the manufacturing and design process may be adjusted to and maintained as multiplies of the increment quantity. The increment quantity may represent some value in the base unit of measure per piece, or in the base unit of measure per alternative unit of measure. The value of the increment quantity must be a rational number, in which both its numerator and denominator are lesser or equal to a length of the conversion factor allocated by the system. This increment quantity may not be equal to the conversion factor derived from the conversion relation received as the input.

In accordance with one embodiment of the present invention, the method 200 may receive three inputs: (1) a conversion relation having a quantity in a base unit of measure ("A") and an alternate quantity in an alternative unit of measure ("B"), (2) a degree of precision for storage ("DPS"), and (3) a length of conversion factor allocated by the system ("LCF").

The base unit of measure is a unit that is used as a standard of comparison for all other units of measure. The alternative unit of measure is, in contrast, another unit that may be used in quantifying the manufacturing and production materials. The conversion relation defines how the alternative unit of measure is related to the base unit of measure. Depending on the given units of measure, the conversion relation may or may not be a standard conversion factor that is used universally. For example, the conversion relation may be how one meter (m) is related to one foot (ft), which is commonly known. Or, the conversion relation may also describe how the length of one piece of cable is related to the weight of that piece of cable. Such a conversion relation is not commonly known, rather, it is generally predefined.

The degree of precision for storage, or the DPS, is the number of decimal places the system uses to store data value in the system. The length of conversion factor is the number of digits allocated by the system in performing conversions of these values. To provide precise one-to-one conversion, the system may store the conversion relation as a rational number, in which the numerator and denominator are integers, instead of using a decimal number. The conversion factor is the conversion relation represented as a rational number. The length of conversion factor is the number of digits allocated for the numerator and denominator by the system.

Once these inputs are received, the method 200 may determine if a "piece" is used as the base unit of measure (box 210). As described above, the dimension piece relates to a manufactured product. During manufacture, component parts typically are consumed by a manufacturing operation to generate a single manufactured product (the piece ("PC"). Thus, product planning tools develop a conversion between various materials, each represented by various dimensions, and the piece. For example, a cable company may define a piece to include a co-axial cable having the length of 1 meter (M) and weight of 1.2 kilograms (KG).

Thus, conversion factors of 1 M/PC and 1.2 KG/PC might be used within the computer system to reflect these associations. If the system needs to subsequently obtain one-to-one conversion from kilograms (KG) to pounds (LB), the increment quantity must be adjusted taking into account the conversion relation between KG and LB, 45359237 KG=100,000,000 LB. This may be done by adjusting the conversion factor 1.2 KG/PC to correspond to 45359237 KG/ 10^DPS. Adjusting the conversion factor may require a large number of decimal places to store the adjusted value to provide accurate one-to-one conversion using embodiments of the present invention. In case the system does not allocate enough storage space to store the exact conversion relation, the conversion relation may be adjusted in calculating the increment quantity. For example, conversion relation between KG and LB, 45359237 KG=100,000,000 LB may be adjusted to 567 KG=1250 LB using a method for approximating a conversion relation commonly known in the art. Alternatively, this alternative unit of measure may be ignored in defining the increment quantity.

If the piece is used as the base unit of measure, then the default increment quantity may be set to be 1 (box 220). If the predefined piece is not used as the base unit, then the method 200 may determine whether the piece is used as one of the various alternative units of measure (box 230). If so, the default increment quantity may be set as the quantity in the base unit of measure that corresponds to each piece (box 240). In doing so, the method 200 may take into account the limitation of the degree of precision for the storage and the length of conversion factor allocated by the system. The default increment quantity determined by the method 240 may be defined as some value in the base unit of measure per piece. The value of the default increment quantity must be a rational number, in which both its numerator and denominator are lesser or equal to the length of the conversion factor, or the LCF. This default increment quantity may not equal to the conversion relation received as input by the method 200.

If the piece is not used as the base unit or as one of the alternative units, or put differently, if the method 200 determines that the piece is not a unit of measure at all (box 250), the method 200 may set the increment quantity to a quantity that is less or equal to the smallest quantity, which could be displayed (box 260). For example, if the system allocates three decimal places for display purposes, the increment quantity may be set to 0.001. The default increment quantity determined by the method 260 may be defined as some value in the base unit of measure per the alternative unit of measure. Again, the value of the default increment quantity must be a rational number, in which both its numerator and denominator are lesser or equal to the length of the conversion factor, or the LCF.

Once the default increment quantity is determined, it must be confirmed by the user. The conversion relation is then adjusted using a method for adjusting a conversion relation illustrated in FIG. 4 according to an embodiment of the present invention. The adjusted conversion relation, or a conversion factor, and the increment quantity are stored in the system. All input values that a user subsequently enters are adjusted so that they are multiples of the increment quantity. By maintaining all data values as multiples of the increment quantity, rounding errors may be reduced. Furthermore, the degree of precision used for display may not be equal to the degree of precision for storage. The method 200 may store these values with sufficient degrees of precision to ensure precise conversion between alternative units of measure. When displaying these values to the user, however, the degrees of precision for these values may be limited to those set by the user. A method for adjusting input values, in accordance with one embodiment of the present invention, is described below in greater detail with reference to FIG. 6.

Figure 3:
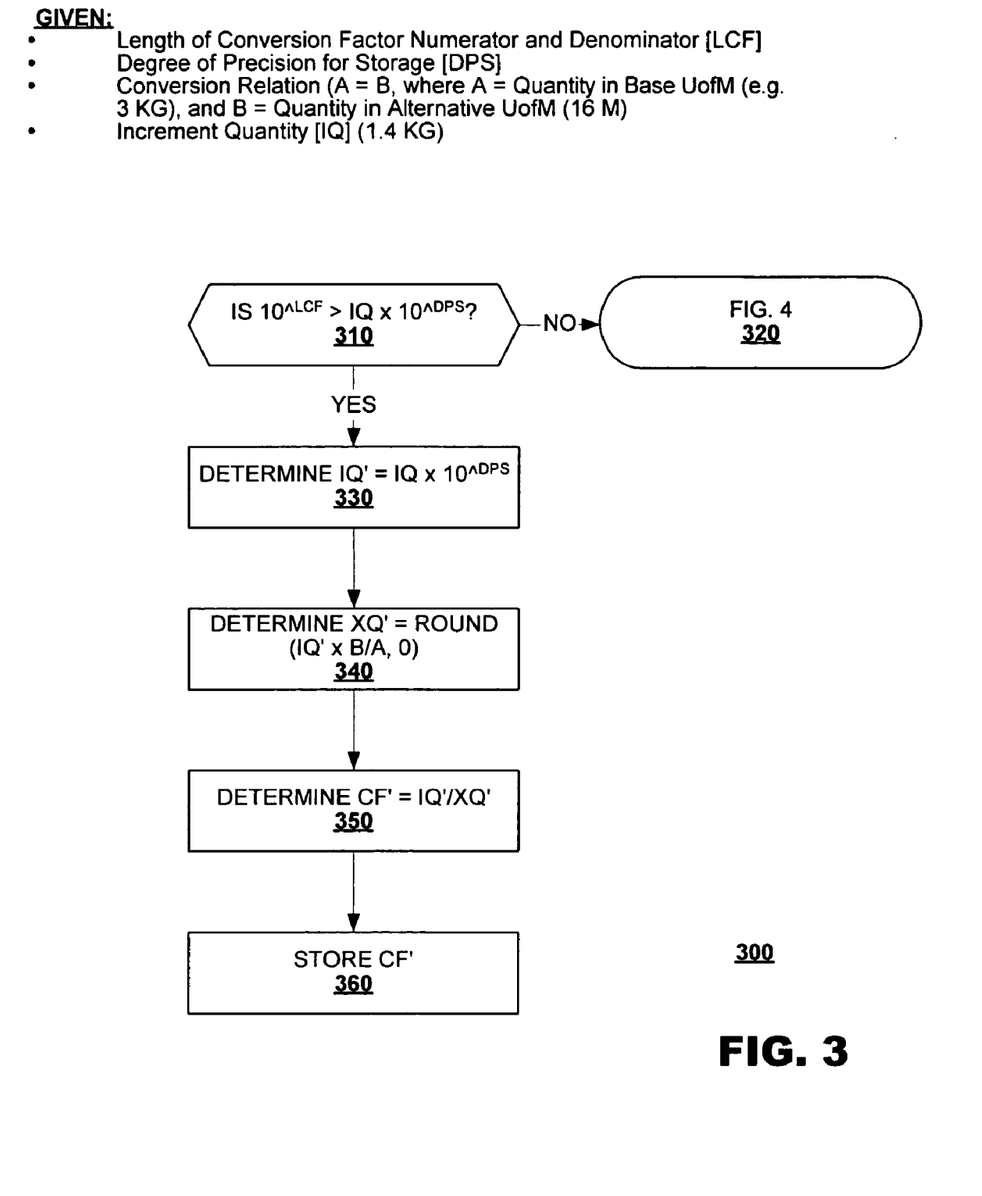
FIG. 3 illustrates a method for adjusting a conversion relation according to an embodiment of the present invention.

FIG. 3 illustrates a method 300 for adjusting a conversion relation according to an embodiment of the present invention. The method 300 may receive four inputs: (1) an increment quantity in base unit of measure ("IQ"), (2) a conversion relation having the quantity in the base unit of measure ("A") and the alternate quantity in the alternative unit of measure ("B"), where both A and B are integers, (3) the degree of precision for storage ("DPS"), and (4) the length of conversion factor ("LCF").

The method 300 may determine if every digit of increment quantity can be represented precisely within the allocated storage space for conversion factors or the LCF (box 310). Put differently, the method 300 may determine if the number of digits of the increment quantity is greater than the LCF. The number of digits of the increment quantity may account for numbers on both sides of the decimal point. For example, the number of digits for a value of 1.145 is equal to 4. To determine whether this condition is satisfied, the method 300 may determine if $10^{\wedge}LCF$ is greater than $IQ \times 10^{\wedge}DPS$. If not, the method 300 terminates (box 320), and the conversion relation is adjusted according to another embodiment of the present invention illustrated in FIG. 4. If so, the method 300 may determine a numerator (IQ') for a conversion factor (box 330). As mentioned previously, the conversion factor is the rational number representation of the conversion relation, which is adjusted to correspond to an increment quantity. The numerator of the conversion factor may be determined as follows:

$$IQ'=IQ \times 10^{-DPS}.$$

The method 300 may determine a denominator (XQ') for the conversion factor (box 340). The denominator may be determined as follows:

$$XQ'=\text{round}(IQ' \times B/A, 0)$$

The function "round (value with decimals, 0)" may round the value with decimals to the nearest integer so as to eliminate decimals. For example, for an input value 1.64, round (1.64, 0) would return 2.

Once the numerator IQ' and the denominator XQ' are determined, the method 300 may determine the conversion factor, (CF') from the numerator IQ' and the denominator XQ' (box 350). The conversion factor may be determined as follows:

$$CF'=IQ'/XQ'.$$

This adjusted conversion factor may be stored as a rational number in the system to provide precise one-to-one conversion (box 360). The method 300 may then terminate. As discussed above, the method 300 may be used only if $10^{-LCF}$ is greater than $IQ \times 10^{-DPS}$.

Representative examples may help to understand embodiments of the present invention. Consider a conversion for the following inputs:
Increment Quantity: 1.4 KG (IQ=1.4 KG)
Conversion Relation: 3 KG=16 M (A=3 KG; B=16 M)
Degree of Precision for Storage: 3 (DPS=3)
Length of Conversion Factor: 4 (LCF=4)

Because $10^{-LCF}$ is greater $IQ \times 10^{-DPS}$, the conversion relation may be adjusted using the method 300.

The method 300 may then determine the IQ' and the XQ' as follows:

$$IQ'=IQ \times 10^{-(DPS)}=1.4 \text{ KG} \times 10^{\wedge}3=1400 \text{ KG}$$

$$XQ'=\text{round } (IQ'*B/A, 0)=7467 \text{ M}$$

The CF' may then be determined from the IQ' and the XQ' as follows:

$$CF'=IQ'/XQ'=(1400 \text{ KG}/7467 \text{ M})=0.18749162984 \text{ KG/M}.$$

The conversion factor may be stored as a rational number in the system to provide precise one-to-one conversion.

Figure 4:
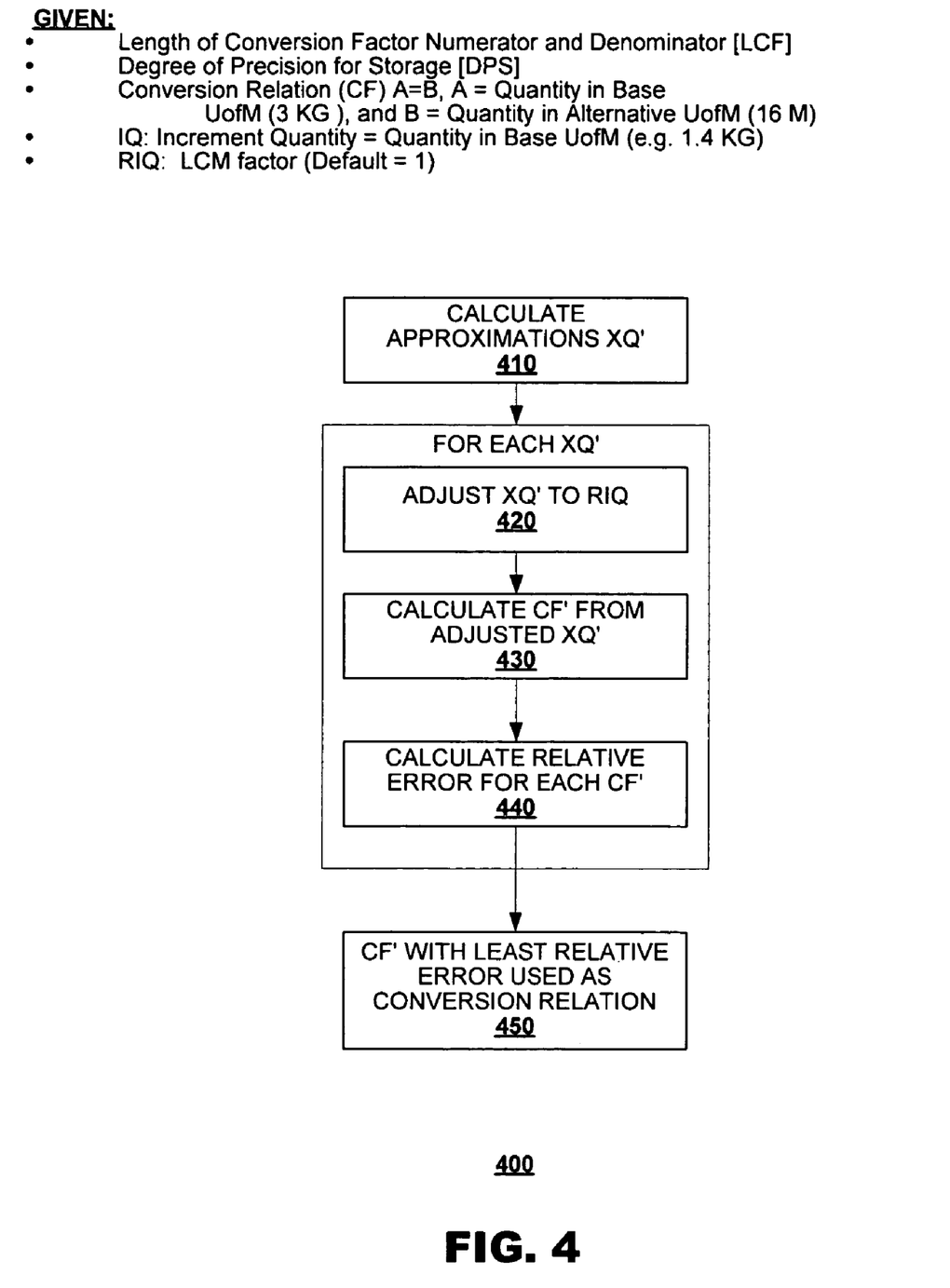
FIG. 4 illustrates a method for adjusting a conversion relation according to another embodiment of the invention.

FIG. 4 illustrates a method 400 for adjusting a conversion relation according to another embodiment of the present invention. The method 400 may be derived from the following equation:

$$IQ=CF \times XQ, \text{ where}$$

IQ=Increment Quantity=Quantity in Base Unit of Measure
CF=Conversion Factor derived from Conversion Relation Received as Input
XQ=Quantity in Alternative Unit of Measure.

In converting a quantity in the base unit of measure to some quantity in the alternative unit of measure using this equation, the quantity in the base unit of measure may be set as an initial increment quantity as described above with reference to FIG. 2. Thus, the IQ of the above equation may be kept constant in carrying out the method 400. To perform this conversion, the following equation may be used:

$$XQ=IQ \times (1/CF)=IQ \times (\text{Denominator of } CF/\text{Numerator of } CF),$$

where
CF=Conversion Factor having a Numerator of CF and Denominator of CF.

In almost all cases, this conversion leads to some quantity in the alternative unit of measure with infinite decimal places, which may not be stored. Thus, such a conversion may cause rounding errors when the value is converted to alternative units of measure of the same or different dimensions. Accordingly, the method 400 according to an embodiment of the present invention provides a solution to this problem by adjusting the numerator and denominator of the conversion factor as described below.

The method 400 may receive five inputs: (1) the increment quantity in base unit of measure (IQ), (2) a conversion relation ("CF") having a quantity in the base unit of measure ("A") and a quantity in the alternative unit of measure ("B") (CF: A=B), (2) the degree of precision for storage ("DPS"), (4) the length of conversion factor ("LCF"), and (5) a least common multiple (LCM) factor ("RIQ").

The method 400 may calculate all approximations of the increment quantity in the alternative unit of measure ("XQ's") in a rational form (box 410). The quantity in the base unit of measure, IQ, and the quantity in the alternative unit of measure, XQ, may be restricted to a certain degree of precision for storage, the DPS, by the system. To determine all approximations, the method 400 may use the following equations:

$$XQ' = numerator\_XQ'/denominator\_XQ'$$

Denominator of all Approximation of the Quantity in the Alternative Unit of Measure:

$$denominator\_XQ' = 2^a \times 5^b,$$

where a=0, 1, ... DPS and b=0, 1, ... DPS;

Numerator of the Quantity in the Alternative Unit of Measure:

$$numerator\_seed = numerator\_IQ \times denominator\_XQ;$$

$$denominator\_seed = denominator\_IQ;$$

$$numerator\_XQ = \frac{numerator\_seed \times denominator\_CF}{denominator\_seed \times numerator\_CF} = \frac{numerator\_seed \times B}{denominator\_seed \times A}$$

When all approximations XQ's are determined, for each of the XQ's, the method 400 may perform the following methods: (1) adjust the XQ' to a reference increment quantity ("RIQ") (box 420), (2) calculate an approximated conversion factor (CF') (box 430), and (3) calculate a relative error for each CF' (box 440). The RIQ is the LCM factor that may be derived from one or more conversion relations using the LCM algorithm without considering the degree of precision for storage. A method for determining the RIQ, or the LCM algorithm is described below in greater detail with reference to FIG. 5.

To adjust XQ' to the LCM factor (box 420), the following equations are used:

$$numerator\_XQ' = round\ (numerator\_XQ'/RIQ, 0) \times RIQ.$$

The adjusted numerator_XQ' and denominator_XQ' may now define an adjusted XQ' approximation.

Using the adjusted XQ' approximation, the approximated conversion factor, CF', may be calculated (box 430) using the following equations:

$$numerator\_CF' = numerator\_seed = numerator\_IQ \times denominator\_XQ';$$

$$denominator\_CF' = denominator\_seed \times numerator\_XQ' = denominator\_IQ \times numerator\_XQ';$$

The numerator_CF' and denominator_CF' may define the approximated conversion factor, CF', as shown below:

$$CF' = numerator\_CF'/denominator\_CF'.$$

Once the CF' is determined, the relative error ("Rel.Err.") may be calculated for the given CF' (box 440) using the following equation:

$$Rel.Err. = (CF - CF')/CF.$$

The Rel.Err. may represent the relative error for each approximation of the quantity in the alternative unit of measure.

The methods 420-440 may be repeated for each of the approximation quantities in the alternative unit of measure, XQ's. When the Rel.Err.s for all of the CF's are determined, they may be compared against one another, and the CF' with the smallest relative error may be determined (box 450). This CF' with the smallest relative error may be set as the adjusted conversion factor ("CF"), which ensures accurate one-to-one conversion between quantities in base unit of measure and quantities in all referred alternative unit of measure. The CF may be stored in the system to adjust future input values. For example, in the example described above with reference to FIG. 3, if the conversion relation is adjusted using the method 400 and if the length of conversion factor is three (LCF=3) and the RIQ is one (RIQ=1), the system would return an adjusted conversion relation of 175 KG=933 M, or an adjusted conversion factor of 175 KG/933 M=0.18756698821 KG/M.

Once the increment quantity and the conversion factor are determined, the system, in accordance with embodiments of the present invention, may use these values as a master datum. When stored in the system, the increment quantity and the conversion factors may not later be changed, and all data values are maintained as multiples of the increment quantities. In this way, embodiments of the present invention may, in turn, reduce the rounding errors. As a result, embodiments of the present invention may provide precise automated conversion among various alternative units defined with different degrees of precision.

Figure 5:
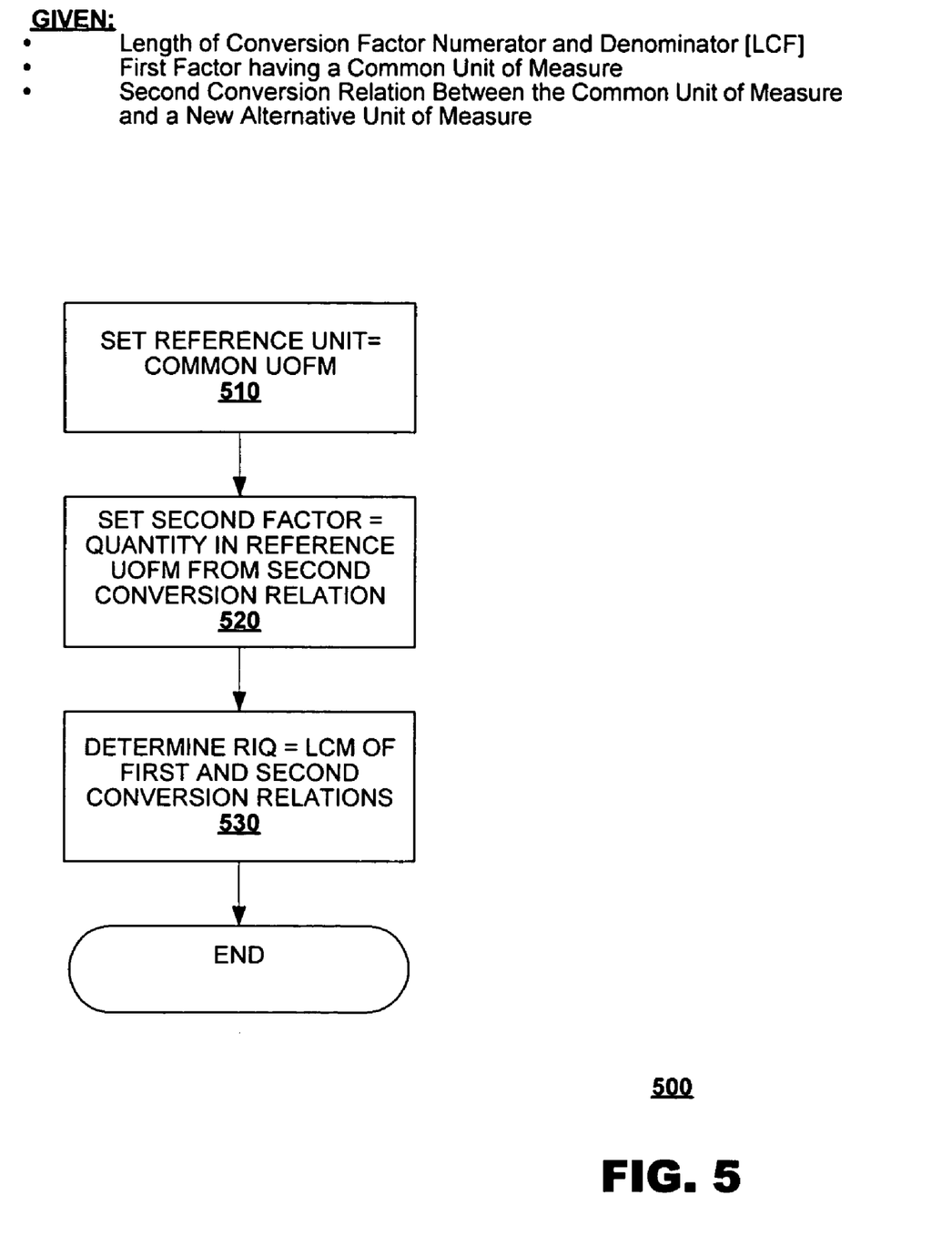
FIG. 5 illustrates a method for determining a reference increment quantity according to another embodiment of the invention.

FIG. 5 illustrates a method 500 for determining a reference increment quantity according to an embodiment of the present invention. The method 500 may have a particular application when more than one alternative units of measure of the same dimension are in use. Many systems may also require frequent conversion between two units of measure of the same dimension. For example, a cable company that sells co-axial cable in pieces may have an U.S. customer and a German customer. In such a case, the cable company must adopt a system that is capable of converting between pieces priced in USDs and Euros. Thus, if it is known to be later converted into another alternative unit of measure (a second alternative unit of measure), the increment quantity must be determined taking into account this second alternative unit of measure of the same dimension to ensure accurate one-to-one conversion.

Units of measure of the same dimension refer to two or more units that quantify the same physical dimension. For example, meters and feet are measurements of the same dimension-length. Similarly kilograms and pounds are alternate measurements of weight. Conversely, meters and kilograms are of a different dimension even though they may be linked by some other association (for example, when dealing with a particular type of material).

If there is only one alternative unit of measure, the method 500 may use one as a default value for the reference increment quantity (RIQ=1). If there are more than one alternative units of measure, the method 500 may receive three inputs: (1) a first factor having a common unit of measure, (2) a second conversion relation between the common unit of measure and a new alternative unit of measure, and (3) the length of conversion factor ("LCF"). The first factor may define a quantity in the common unit of measure. The second conversion relation may define how the new alternative unit of measure is related to the common unit of measure. The length of conversion factor is the number of digits allocated for the numerator and denominator of the conversion factor by the system.

The method 500 may set a reference unit as the common unit of measure in the first and second conversion relations (box 510). The method 500 may set a second factor as the quantity in a reference unit of measure from the second conversion relation (box 520). The method 500 may then determine the reference incremental quantity ("RIQ") by calculating the LCM of the first factor and the second factor, thereby taking into account the new alternative unit of measure (box 540). This reference increment quantity may be used in the method 400 for adjusting a conversion relation as described above with reference to FIG. 4 according to one embodiment of the present invention.

A representative example is set forth below to better illustrate the method 500 according to embodiments of the present invention. Consider one-to-one conversions from meters (M) to inches (IN), given the following inputs;

First factor: 1 M
Second conversion relation: 127 M=5000 IN
Length of Conversion Factor: 4 (LCF=4)

The method 500 may set a reference unit of measure as meters (M), which is the common unit of measure between the first and second conversion relations. The method 500 may then set the second factor as the quantity in the reference unit of measure, i.e., meters (M), from the second conversion relation (127 M=5000 IN).

Second Factor=127

The method 500 may then determine the RIQ by calculating the LCM of the first and second factors.

$$RIQ=LCM \text{ (first factor, second factor)}=LCM(1, 127)$$
$$=127.$$

Additionally, if it is required to obtain one-to-one conversion from meters (M) to inches (IN) and to feet (FT), a new RIQ must be determined, given the following inputs.

First factor: 127 (from 127 M=5000 IN)
Second conversion relation: 381 M=1250 FT
Length of Conversion Factor: 4 (LCF=4)

The reference unit of measure is still meters (M), which is the common unit of measure for the first factor and the second conversion relation. The method 500 may then set the second factor as 381, the quantity in the reference unit of measure from the second conversion factor. The method 500 may then determine the RIQ by calculating the least common multiple of the first and second factors.

$$RIQ=LCM \text{(first factor, second factor)}=LCM(127, 381)=381.$$

This RIQ may be used by the method 400 for adjusting the conversion relation according to one embodiment of the present invention. Thus, in the example described above with reference to FIG. 3, if the conversion relation is adjusted using the method 400 and if the length of conversion factor is three (LCF=3) and the RIQ is 381 (RIQ=381), the system would return an adjusted conversion relation of 70 KG=381 M, or an adjusted conversion factor of 70 KG/381 M=0.18372703412 KG/M.

Figure 6:
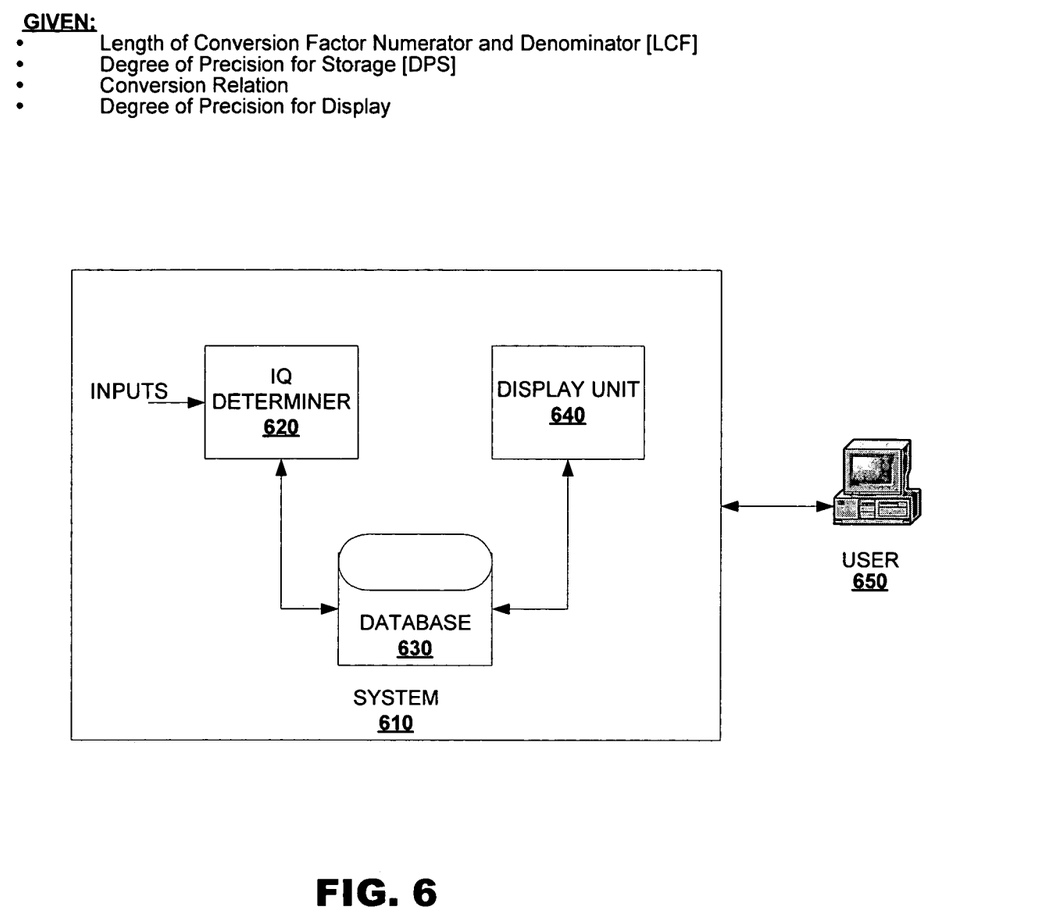
FIG. 6 illustrates a product planning system that provides conversions among various alternative units of measure according to an embodiment of the present invention.

FIG. 6 illustrates a product planning system 610 that provides conversions among various alternative units of measure according to an embodiment of the present invention. The system 610 may receive four inputs: (1) a conversion relation having a quantity in a base unit of measure and an alternate quantity in an alternative unit of measure, (2) a degree of precision for storage ("DPS"), (3) a length of conversion factor ("LCF"), and (4) a degree of precision for display. The system 610 may include an increment quantity determiner 620, a database 630, and a display unit 640.

Once the aforementioned three inputs are received, the IQ determiner 620 may determine an increment quantity using the IQ derivation method in accordance with embodiments of the present invention. This increment quantity is then stored in the database 630. The increment quantity stays constant throughout the manufacturing process, and cannot later be changed.

The display unit 640 may display data values with specific degrees of precision set by set by the system for display, or the degree of precision for display. The degrees of precision used for display purposes (the degree of precision for display) may not be equal to the degrees of precision used to store these values (the degree of precision for storage). This is because it is not convenient for the user to see the approximation quantities as multiples of the increment quantity, and also partly due to the limited available system capacity. Thus, the system 610 may store these values with sufficient degrees of precision to ensure precise conversion between alternative units of measure. When displaying these values to the user, however, the system 610 may limit the degree of precision for these values to those set by the user.

Embodiments of the present invention may provide precise one-to-one conversion without displaying the approximation quantities to the user because if the increment quantity is equal or less than $10^{(-DPS)}$, the approximations are not visible to the user. Typical manufacturing systems, such as the R/3 application commercially available from SAP AG, store quantities with three decimal places and display quantities with three decimal places. For such systems, embodiments of the present invention may define the degree of precision for storage as 14 decimal places, and the length of conversion relations/factors with 15 digits, which is 1+the degree of precision for storage. These 15-digit conversion factors may be stored one-to-one in IEEE 754 double precision floating point numbers, which are commonly available on computer systems.

Figure 7:
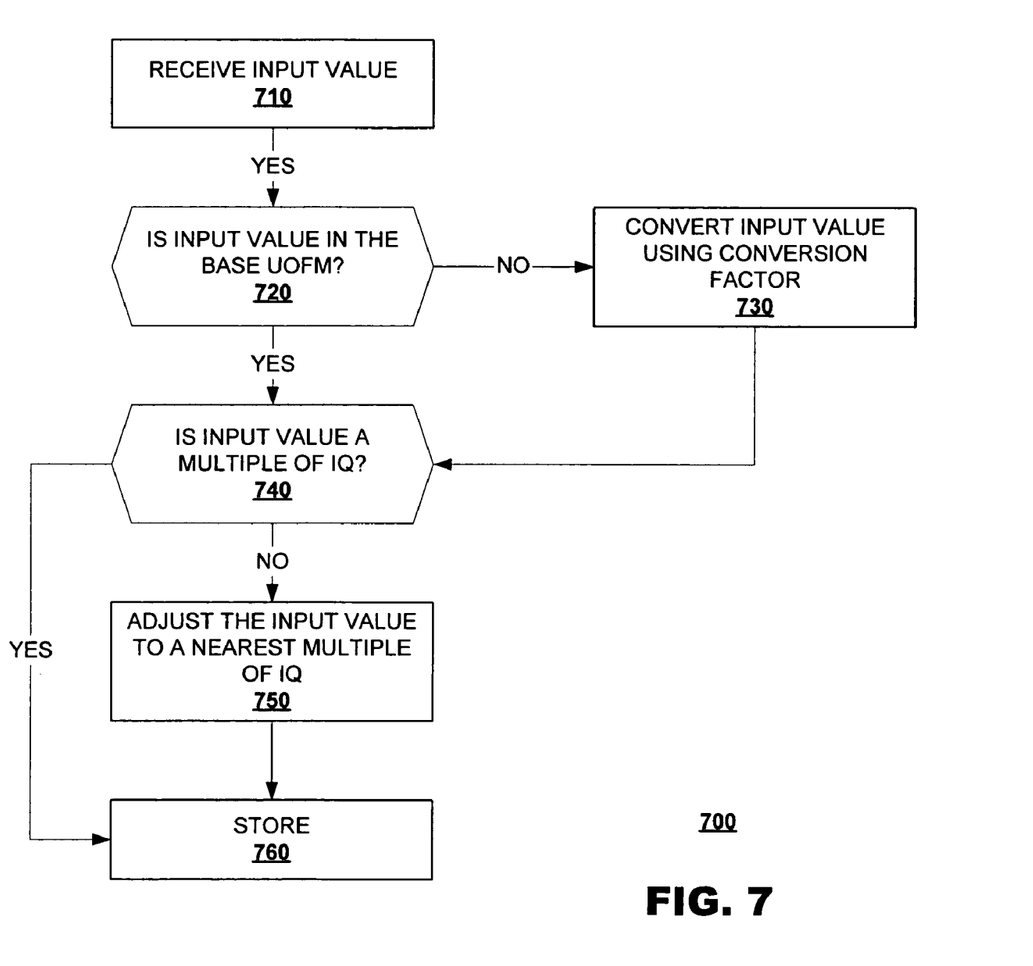
FIG. 7 illustrates a method for adjusting an input value according to an embodiment of the present invention.

FIG. 7 illustrates a method 700 for adjusting an input value according to one embodiment of the present invention. According to embodiments of the present invention, the input value refers to any new quantity input to the system regardless of its source. The input value may be received from a user, another program in the system, and/or the like. The method 700 may receive an input value with a specified degree of precision entered by either a user or from another system (box 710). The method 700 may then determine whether the input value is in the base unit (box 720). If so, the method 700 may determine whether the input value is a multiple of the approximated increment quantity (box 740). If so, the input value may be stored in the system as is (box 760). If the input value is not a multiple of the approximated quantity (box 740), the input value may be adjusted to the nearest multiple of the approximated increment quantity (box 750). The adjusted input value may then be stored in the system (box 760).

If the input value is in an alternative unit of measure (box 720), the method 700 may convert the input value to some quantity in the base unit of measure using a conversion factor between the base unit of measure and the alternative unit of measure (box 730). The method 700 may then determine if the converted input value is a multiple of the approximated increment quantity (box 740). If so, the input value may be stored as is (box 760). If not, the input value may be adjusted to the nearest multiple of the approximated increment quantity (box 750), and the adjusted input value may be stored in the system (box 760).

For instance, consider an input value of 1.5 M with the degree of precision for display set to two (DP of Display=2) and the LCF of five (LCF=5). Assume further that the associated increment quantity and conversion factor are as follows:

$$IQ=0.00381 \; CF=0.00381 \text{ M}/0.01250 \text{ FT}.$$

An input value of 1.5 M may then be rounded to 1.50114 M for storage purposes, which is the nearest multiple of the increment quantity, 0.00381 M. Because the DP for Display is set to two, a value of 1.50 M may be displayed according to one embodiment of the present invention.

Embodiments of the present invention, thus, maintain all data values as multiples of the increment quantities, and may, in turn, reduce the rounding errors. As a result, embodiments of the present invention may provide precise automated conversion among various alternative units defined with different degrees of precision.

Referring back to the cable company example described in the background section, consider again that the cable company uses an inventory management system, which allocates three decimal places for storing the weight of the cable pieces and two decimal places for display. Also, the company handles the cable in pieces, where one piece of cable weighs 2.333 KG/PC. Assume further that there were three pieces of cable pieces in the stock originally, but each piece was sold separately one piece after another. Because the conversion relation is adjusted to 233 KG=1000 PC, if the inventory management system adopts embodiments of the present invention, the system may store and display the following:

| No. of Cable Pieces in Stock | Total Weight (KG) as Stored in System | Total Weight (KG) as Displayed |
| --- | --- | --- |
| 3 | 6.999 | 7.00 |
| 2 | 4.666 | 4.67 |
| 1 | 2.333 | 2.33 |
| 0 | 0.000 | 0.00 |

Throughout the foregoing description, examples are provided in the context of product manufacturing systems, which handle materials in pieces (PC). These examples have been used based on an expectation that doing so makes it easier to explain the principles of the present invention to a lay audience. The principles of the present invention find application in such embodiments, of course, but it is not so limited. The principles of the present invention find application in embodiments outside of the product manufacturing systems that do not handle materials in pieces (PC), but require large-scale conversions among various alternative units of measure.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A computer-implemented method, comprising:
   determining a storage length of computer-readable memory allocated in a computer system for decimal quantities;
   determining a storage length of computer-readable memory allocated in the computer system for a conversion relation between a base unit of measure and an alternative unit of measure;
   determining an increment quantity for the base unit of measure based on the conversion relation between the base unit of measure and the alternative unit of measure and based on the storage length allocated for decimal quantities and the storage length allocated for the conversion relation;
   if the increment quantity can be represented precisely within the storage length allocated for the conversion relation, adjusting the increment quantity and conversion relation by:
      calculating an alternative increment quantity from the increment quantity and the storage length allocated for decimal quantities in the base unit of measure,
      calculating an integer alternative quantity from the alternative increment quantity and the conversion relation,
      calculating an adjusted conversion relation from the alternative increment quantity and the integer alternative quantity,
   storing the adjusted conversion relation and the increment quantity in a first computer-readable memory location,
   converting, based on the adjusted conversion relation, a quantitative measurement from the base unit of measure to one of the alternative unit of measure respectively to generate a converted quantitative measurement, the quantitative measurement representing a first quantitative characteristic corresponding to an amount of an item present in an inventory system and the converted quantitative measurement representing a second quantitative characteristic corresponding to the amount of the item present in the inventory system,
   storing the converted quantitative measurement in a second computer-readable memory location; and
   providing the converted quantitative measurement on a computer display unit to a user.

2. The method of claim 1, further comprising, responsive to an input quantity expressed in the alternative unit of measure, converting the input quantity to a nearest corresponding increment quantity based on the adjusted conversion relation.

3. The method of claim 1, further comprising:
   receiving input data at the computer system for quantities in the base unit of measure, and
   rounding the input data to nearest multiples of the increment quantity.

4. The method of claim 1, further comprising:
   receiving input data at the computer system for quantities in the alternative unit of measure,
   converting the input data to quantities in the base unit of measure according to the adjusted conversion relation,
   rounding the converted input data to nearest multiples of the increment quantity, and
   storing the rounded input data in memory.

5. A computer-implemented method, comprising:
   determining a storage length of computer-readable memory allocated in a computer system for decimal quantities;
   determining a storage length of computer-readable memory allocated in the computer system for a conversion relation between a base unit of measure and an alternative unit of measure;
   determining an increment quantity for the base unit of measure based on the conversion relation between the base unit of measure and the alternative unit of measure and based on the storage length allocated for decimal quantities and the storage length allocated for the conversion relation;
   if the increment quantity cannot be represented precisely within the storage length allocated for the conversion relation, adjusting the increment quantity and conversion relation by:
      calculating a plurality of approximations for the increment quantity in the alternative unit of measure that can be represented within the storage length allocated for decimal quantities;
      for each approximation:
         adjusting the approximation according to a reference increment quantity,
         calculating an adjusted conversion relation according to the adjusted approximation, determining a relative error between the conversion relation and the adjusted conversion relation, storing the adjusted conversion relation that is associated with the lowest relative error in a first computer-readable memory location, converting, based on the adjusted conversion relation, a quantitative measurement from the base unit of measure to one of the alternative unit of measure respectively to generate a converted quantitative measurement, the quantitative measurement representing a first quantitative characteristic corresponding to an amount of an item present in an inventory system and the converted quantitative measurement representing a second quantitative characteristic corresponding to the amount of the item present in the inventory system.

storing the converted quantitative measurement in a second computer-readable memory location; and providing the converted quantitative measurement on a computer display unit to a user.

6. The method of claim 5, wherein the reference increment quantity is determined by calculating a least common multiple of a first quantity and a second quantity, wherein:

the first quantity is a quantity in the alternative unit of measure, the second quantity is a quantity in a new alternative unit of measure, wherein the second quantity is derived from a second conversion relation between the alternative unit of measure and the new alternative unit of measure.

7. The method of claim 5, further comprising, responsive to an input quantity expressed in the alternative unit of measure, converting the input quantity to a nearest corresponding increment quantity based on the adjusted conversion relation.

8. The method of claim 5, further comprising:

receiving input data at the computer system for quantities in the base unit of measure, and rounding the input data to nearest multiples of the increment quantity.

9. The method of claim 5, further comprising:

receiving input data at the computer system for quantities in the alternative unit of measure, converting the input data to quantities in the base unit of measure according to the adjusted conversion relation, rounding the converted input data to nearest multiples of the increment quantity, and storing the rounded input data in memory.

10. A computer readable medium, the computer readable medium having program instructions stored thereon, that when executed by a processor, cause the processor to:

determine a storage length of computer-readable memory allocated in a computer system for decimal quantities;

determine a storage length of computer-readable memory allocated in the computer system for a conversion relation between a base unit of measure and an alternative unit of measure;

determine an increment quantity for the base unit of measure based on the conversion relation between the base unit of measure and the alternative unit of measure and based on storage length allocated for decimal quantities and the storage length allocated for the conversion relation;

if the increment quantity can be represented precisely within the storage length allocated for the conversion relation, adjust the increment quantity and conversion relation by:

calculate an alternative increment quantity from the increment quantity and the storage length allocated for decimal quantities in the base unit of measure, calculate an integer alternative quantity from the alternative increment quantity and the conversion relation, calculate an adjusted conversion relation from the alternative increment quantity and the integer alternative quantity, store the adjusted conversion relation in a first computer-readable memory location, convert, based on the adjusted conversion relation, a quantitative measurement from the base unit of measure to one of the alternative unit of measure, respectively to generate a converted quantitative measurement, the quantitative measurement representing a first quantitative characteristic corresponding to an amount of an item present in an inventory system and the converted quantitative measurement representing a second quantitative characteristic corresponding to the amount of the item present in the inventory system, store the converted quantitative measurement in a second computer-readable memory location; and provide the converted quantitative measurement on a computer display unit to a user.

11. The computer readable medium of claim 10, wherein the instructions further cause the executing device, in response to an input quantity expressed in the alternative unit of measure, to convert the input quantity to a nearest corresponding increment quantity based on the adjusted conversion relation.

12. The computer readable medium of claim 10, wherein the instructions further cause the executing device to:

receive input data at the computer system for quantities in the base unit of measure, and round the input data to nearest multiples of the increment quantity.

13. The computer readable medium of claim 10, wherein the instructions further cause the executing device to:

receive input data at the computer system for quantities in the alternative unit of measure, convert the input data to quantities in the base unit of measure according to the adjusted conversion relation, round the converted input data to nearest multiples of the increment quantity, and store the rounded input data in memory.

14. A computer readable medium, the computer readable medium having program instructions stored thereon, that when executed by a processor, cause the processor to:

determine a storage length of computer-readable memory allocated in a computer system for decimal quantities;

determine a storage length of computer-readable memory allocated in the computer system for a conversion relation between a base unit of measure and an alternative unit of measure;

determine an increment quantity for the base unit of measure based on the conversion relation between the base unit of measure and the alternative unit of measure and based on the storage length allocated for decimal quantities and the storage length allocated for the conversion relation, the increment quantity corresponding to an alternate quantity in the alternative unit of measure;

if the increment quantity cannot be represented precisely within the storage length allocated for the conversion relation, adjust the increment quantity and the conversion relation by:

calculate a plurality of approximations for the increment quantity in the alternative unit of measure whose degree of precision can be represented within the storage length;

for each approximation:
adjust the approximation according to a reference increment quantity,
calculate an approximate adjusted conversion relation according to the adjusted approximation,
determine a relative error between the conversion relation and the approximate adjusted conversion relation,
store the adjusted conversion relation that is associated with the lowest relative error in a first computer-readable memory location,
convert, based on the adjusted conversion relation, a quantitative measurement from the base unit of measure to one of the alternative unit of measure respectively to generate a converted quantitative measurement, the quantitative measurement representing a first quantitative characteristic corresponding to an amount of an item present in an inventory system and the converted quantitative measurement representing a second quantitative characteristic corresponding to the amount of the item present in the inventory system,
store the converted quantitative measurement in a second computer-readable memory location; and
provide the converted quantitative measurement on a computer display unit to a user.

15. The computer readable medium of claim 14, wherein the instructions further cause the executing device, in response to an input quantity expressed in the alternative unit of measure, to convert the input quantity to a nearest corresponding increment quantity based on the adjusted conversion relation.

16. The computer readable medium of claim 14, wherein the instructions further cause the executing device to:
receive input data at the computer system for quantities in the base unit of measure, and
round the input data to nearest multiples of the increment quantity.

17. The computer readable medium of claim 14, wherein the instructions further cause the executing device to:
receive input data at the computer system for quantities in the alternative unit of measure,
convert the input data to quantities in the base unit of measure according to the adjusted conversion relation,
round the converted input data to nearest multiples of the increment quantity, and
store the rounded input data in memory.

18. A computer readable medium, the computer readable medium having program instructions stored thereon, that when executed by a processor, cause the processor to:
determine an increment quantity for a base unit of measure based on a conversion relation between a base unit and an alternative unit and based on a degree of precision for storage and a length of the conversion relation, the increment quantity being the smallest quantity to be used by the processor as a base increment in quantifying a product, the degree of precision for storage being the number of decimal places allocated to store quantities by the processor and the length of conversion relation being the number of digits allocated by the processor to store conversion relation;
adjust the conversion relation with respect to the increment quantity;
convert a quantitative measurement from the base unit of measure to one of the alternative unit of measure respectively to generate a converted quantitative measurement, the quantitative measurement representing a first quantitative characteristic corresponding to an amount of an item present in an inventory system and the converted quantitative measurement representing a second quantitative characteristic corresponding to the amount of the item present in the inventory system;
store the converted quantitative measurement in a computer-readable memory location; and
provide the converted quantitative measurement on a computer display unit to a user.

19. The computer readable medium of claim 18, further comprising storing the increment quantity and the adjusted conversion relation for use in conversion of quantities from the based unit of measure and the alternative unit of measure.

20. The computer readable medium of claim 18, further comprising, adjusting an input value to a multiple of the increment quantity using the adjusted conversion relation.

21. The computer readable medium methed of claim 20, wherein, if the input value received is a quantity in the base unit of measure, the input value is adjusted by:
converting the input data to quantities in the base unit of measure according to the adjusted conversion relation,
rounding the converted input data to nearest multiples of the increment quantity, and storing the rounded input data in memory.

22. The computer readable medium of claim 20, wherein, if the input value received is a quantity in the alternative unit of measure, rounding the input data to nearest multiples of the increment quantity.

23. The computer readable medium method of claim 18, wherein the base unit and the alternative unit are of different dimensions.

24. The computer readable medium of claim 18, wherein the reference unit and the base unit are of the same dimension.

25. The computer readable medium method of claim 18, wherein, if the increment quantity can be represented precisely within storage space limited by the length of conversion relation, the conversion relation is adjusted by:
determining an approximated increment quantity from the increment quantity and the degree of precision for storage;
determining an approximated quantity in the alternative unit of measure from the increment quantity and the conversion relation; and
adjusting the conversion relation by rounding the approximated mated quantity in the alternative unit of measure to a nearest integer.

26. The computer readable medium of claim 18, wherein, if the increment quantity cannot be represented precisely within storage space limited by the length of conversion relation, the conversion relation is adjusted by:
calculating a plurality of approximations for the quantity in the alternative unit of measure that can be represented within the storage length;
for each approximation:
adjusting the approximation to correspond to a reference increment quantity, calculating an approximate conversion relation according to the adjusted approximation, and
determining a relative error between the conversion relation and the approximate conversion relation; and
wherein the conversion relation is adjusted to the approximate conversion relation that is associated with the lowest relative error.

27. The computer readable medium of claim 26, wherein the reference increment quantity is determined by calculating a least common multiple of a first quantity and a second quantity, wherein:
   the first quantity is a quantity in the alternative unit of measure,
   the second quantity is a quantity in a new alternative unit of measure, wherein the second quantity is derived from a second conversion relation between the alternative unit of measure and the new alternative unit of measure, wherein the alternative unit of measure and the new alternative unit of measure are of the same dimension.

28. The computer readable medium of claim 26, wherein the reference increment quantity is determined by calculating a least common multiple of a first quantity, a second quantity, and a third quantity, wherein:
   the first quantity is a quantity in the alternative unit of measure,
   the second quantity is a quantity in a second alternative unit of measure, wherein the second quantity is derived from a second conversion relation between the alternative unit of measure and the second alternative unit of measure,
   the third quantity is a quantity in a third alternative unit of measure, wherein the third quantity is derived from a third conversion relation between the alternative unit of measure and the third alternative unit of measure, wherein the alternative unit of measure, the second alternative unit of measure, and the third alternative unit of measure are of the same dimension.

* * * * *